April 22, 1958     I. A. WEAVER ET AL     2,831,551
SAFETY DEVICE FOR LIFTING JACKS Filed May 6, 1953     3 Sheets-Sheet 1

INVENTORS:
Ira A. Weaver
William A. Ross

By: Brown, Jackson, Boettcher & Dienner
Attys.

INVENTORS:
Ira A. Weaver
William A. Ross

By: [signature]
Attys.

United States Patent Office 2,831,551
Patented Apr. 22, 1958

2,831,551

SAFETY DEVICE FOR LIFTING JACKS

Ira A. Weaver and William A. Ross, Springfield, Ill., assignors to Weaver Manufacturing Company, Springfield, Ill., a corporation of Illinois Application May 6, 1953, Serial No. 353,414

17 Claims. (Cl. 188—67)

This invention relates, in general, to an improved safety device for lifting jacks, and has particular relation to a safety device particularly adapted for use with airplane wing jacks and the like.

It has been common practice prior to the present invention to use two or more jacks under the wings of an airplane in order to remove the weight from the landing wheels, for example, so that replacement may be made of tires, brakes, wheels, bearings, struts or the mechanism for lifting the strut and wheel into the plane during flight.

Jacks of the aforementioned character are commonly operated hydraulically and various methods of lengthening or extending the jack to take wings, for example, from three to twenty feet from the ground have been provided. These jacks require a hose, for example, of synthetic rubber or the like to enable accomplishment of the lift, for example, by a pump or other source of fluid pressure mounted upon one of the legs of the jack and the connected cylinder of the jack which may be, for example, fifteen feet from the ground. With such jacks there is always the danger that a hose may be fractured or a fitting broken or a failure of the packing of the cylinder, thereby permitting the piston to lower rapidly and cause excessive damage to the plane.

With the larger planes as many as eight jacks are required under the wings and it is very important that no one jack should fail while supporting the weight of the plane. The present jacks are all required to have a safety nut which is held in place by the piston which has a quick pitch or steep thread which allows the nut to turn while the piston is raising. The weight of the nut permits the nut to remain in close proximity to the packing gland on the end of the cylinder or to some other suitable seat for the safety nut. When, for example, this piston becomes dirt covered or the threads become mutilated, the nut as heretofore employed will fail to turn and will raise with the piston, and when this occurs the safety feature has disappeared.

When lowering a jack provided with a safety nut as heretofore employed, it has been necessary for the operator who is located at each jack to leave his position, for example, at the hydraulic unit to climb up the framework and spin the nut to the top of the thread and then lock the nut in that position with a screw or the like so that it will not return. This entirely removes the safety feature and allows the piston to be lowered at any speed the operator desires. Should fracture of the hose occur or should any fitting in the hydraulic system fail at this time, the plane would then lower rapidly or uncontrolled and quite often such occurrence would result in springing the wing beyond repair or in other damage.

It has also been found that the overload relief valve that has been built, for example, into the hydraulic system of hydraulic lifting jacks can be overloaded while lowering and if too much weight is received on one jack this valve will remain open and the operator cannot stop the lowering which gives the same effect as if a hose would break.

One of the main objects of the present invention is to provide an improved safety device which will overcome the shortcomings and difficulties encountered with the safety nuts previously employed.

Another object is to provide means effective to control the distance the safety nut may leave its seat.

Another object is to provide means for lifting the safety nut a predetermined distance and for holding the nut in raised position when required for lowering the piston.

Another object is to combine in a relatively simple and compact structure of the character described both the means for controlling the distance the safety nut may leave its seat and the means for lifting the safety nut to raised position and for holding the nut in such position when required for lowering the piston.

Another object is to provide in a lifting jack of the character described a framework for supporting the cylinder of the jack in upright position and means for actuating the safety nut lifting means from position at the bottom of the framework and more particularly from the operator's position, for example, at the controls of the hydraulic unit for actuating the piston.

Another object is to provide a device which will enable lowering of the piston much faster than heretofore possible and with assurance of the presence of the full safety feature at all times during the lowering operation as well as at all times during raising or elevation of the piston.

Another object is to eliminate the necessity of the operator climbing the jack and turning the nut to the top of the screw and locking the nut in place prior to each lowering of the piston.

Another object is to provide a shear pin for holding the safety mechanism in place and which will allow this mechanism to break loose in case the nut fails to turn while the piston is being raised.

Another object is to provide for effective coaction between a pivoted yoke or fork of the safety mechanism and the safety nut and more particularly a coaction provided by rollers carried by a pair of arms of the yoke engaging at opposite sides of a groove in the safety nut to impose substantially equal load on each roller.

Another object is to provide for conveniently adjusting the distance at which the safety nut is stopped from its seat.

Another object is to provide an element for actuating the safety nut lifting means from remote position and a resilient connection between this element and the nut lifting means so that the operator has less chance of letting the nut seat accidentally.

Further objects and advantages of the invention will be apparent from the following detailed description taken in connection with the accompanying drawings, it being understood that the invention is limited only within the scope of the appended claims and not to the particular embodiment selected for illustration.

Figure 4:
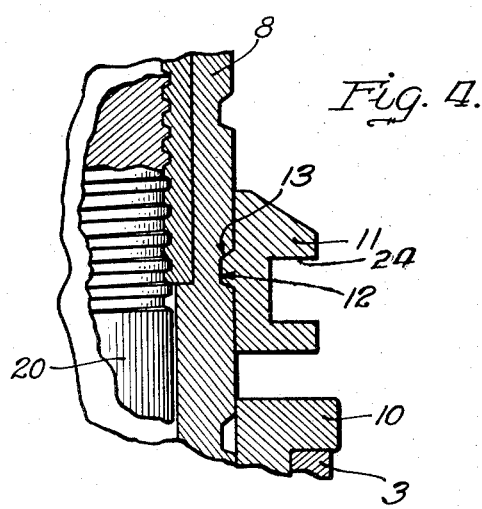
Figure 5:
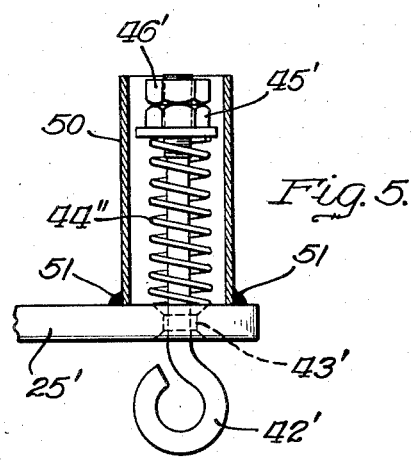

Figure 4 is a fragmentary detailed section through the safety nut and the adjacent part of the piston showing the relatively steep internal thread in the nut and its coaction with the relatively steep external thread on the piston rod; and Figure 5 is a fragmentary detail view showing a modified form of resilient connection between the flexible actuating element and the yoke of the safety mechanism.

Referring now to the drawings, the jack selected for illustration is of the hydraulically actuated type having a supporting framework 1. This framework 1 has legs 2 supporting the jack cylinder 3 at their upper converging ends. While only two of the legs 2 are illustrated, it is to be understood that where there are four legs, the other two legs are behind and concealed by the legs shown in Figure 1. It is to be further understood that the supporting frame may be of tripod or other suitable form and may be provided, if desired, with wheels or rollers (not shown) for portability and ease of handling.

Mounted on one of the legs 2 is a pump or other fluid pressure supplying unit 4 connected to the bottom of the cylinder 3 by a hose 5 which may be formed of synthetic rubber or other suitable material. The pump 4 has a lever 6 by means of which the operator shown at 7 controls a lowering valve (not shown) for lowering the piston rod 8 which has a piston (not shown) operable in the cylinder 3 to raised and lowered positions. Another lever 9 may be provided for manually operating the pump 4 to raise or elevate the piston 8, all as well known in the art.

The upper end of the cylinder 3 is closed, for example, by a packing gland 10 through which the piston rod 8 operates. A safety nut 11 encircles and is held in place by the piston rod 8. This nut 11 has a quick pitch or relatively steep internal thread 12 (Figure 4) which engages or coacts with a correspondingly relatively steep external thread 13 on the piston rod 8. The coaction of these threads acts in the raising of the piston rod 8 to raise the nut 11 from its fixed seat 14 formed, for example, on the packing gland 10 and to position in close proximity to the seat 14 and allows the nut 11 to turn while the piston is raising. Ordinarily the weight of the nut 11 permits or causes the nut to remain in close proximity to the seat 14. The piston rod 8 may be splined or keyed against turning relative to the cylinder 3, for example, by a key 15 secured by a pin 16 in a keyway 17 in the packing gland 10 and engaging in a keyway 18 in the piston rod 8.

Figure 1:
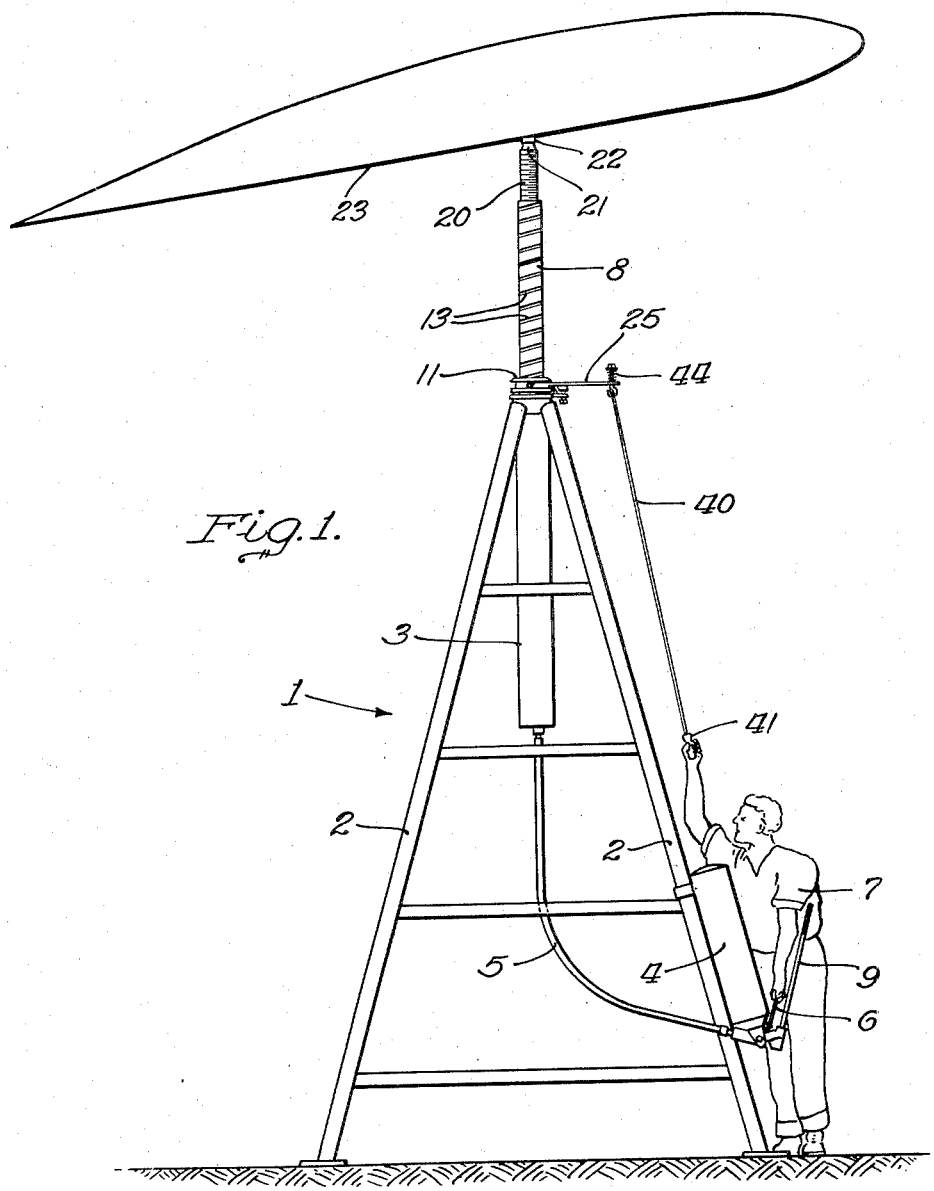
Figure 1 illustrates in elevation and somewhat schematically a lifting jack embodying the safety mechanism of the present invention and shown as applied as an airplane wing jack.

Screwed into the piston rod 8 and shown in Figure 1 projecting from the upper end of the piston is a screw extension 20 which functions as well understood in the art. The upper end of the extension 20 is formed at 21 for engagement with the cooperating part 22 on the bottom of the airplane wing shown more or less diagrammatically at 23.

The safety nut 11 has an annular external groove 24. A fork or yoke 25 is pivoted at 26 on a fulcrum 27 which may be formed integral with the packing gland 10. The yoke 25 has a forked part with arms 28 at opposite sides of the nut 11. Rollers 29 carried by the arms 28 operate in the groove 24 and thus provide coaction between the yoke 25 and nut 11 so that raising of the nut 11 from its seat 14 imparts swinging movement to yoke 25 in a clockwise direction about its fulcrum 27. On the other hand, in drawing the outer free end of the yoke 25 downwardly as will hereinafter appear, the accompanying swinging movement of the yoke 25 clockwise about its fulcrum 27 acts through the rollers 29 to lift the nut 11 to raised position.

To control the distance the safety nut 11 may leave its seat 14, there is provided a stop shown in the form of a screw 30 screwed, for example, through an integral lug 31 on the packing gland 10. In the pivotal movement of the yoke 25 about the fulcrum 27, an abutment 32 on the yoke 25 abuts or engages the upper end of the screw 30 and stops the pivotal movement of the yoke in a clockwise direction at position with the nut 11 spaced from but in relatively close proximity to the seat 14. By screwing the screw 30 upwardly or downwardly from the lug 31, the distance at which the nut 11 is stopped from its seat 14 may be readily adjusted. At 34 is a lock nut which may be set to lock the screw 30 in a position for the proper amount of upward travel of the nut 11.

The yoke assembly 25 is held in place adjacent to the fulcrum 27 by a shear pin 35, for example, in the form of a cotter pin which is engaged in a slot 36 in one or more lugs 37 integral, for example, with the packing gland 10. The shear pin 35 overlies the yoke 25 and allows the yoke to break loose and fall to the ground to warn the operator in case the nut 11 fails to turn while the piston rod 8 is being raised.

For the purpose of lifting the nut 11 to raised position in relatively close proximity to the seat 14 and for holding the nut 11 in such position when required for lowering the piston rod 8 there is provided a flexible actuating or control element 40 which may be in the form of a rope, or a strap, or the like. The lower end of this element 40 has a handle 41 which is accessible to the operator 7 from his position at the controls for the pump 4. The upper end of the element 40 is connected preferably resiliently to the outer end of the pivoted yoke 25. The resilient connection may comprise an eye bolt 42 connected to the element 40 and having its stem movable freely through an opening 43 in the yoke 25. A spring 44 encircles the stem of the bolt 42 and is interposed between the adjacent side of the yoke 25 and an abutment washer 45 held in place by a nut 46 screwed on the bolt 42. A lock nut is provided at 47 for the nut 46 and washer 45. With the resilient connection thus described, the operator has less chance of letting the nut 11 seat accidentally against its seat 14 in the operation of the device.

Figure 2:
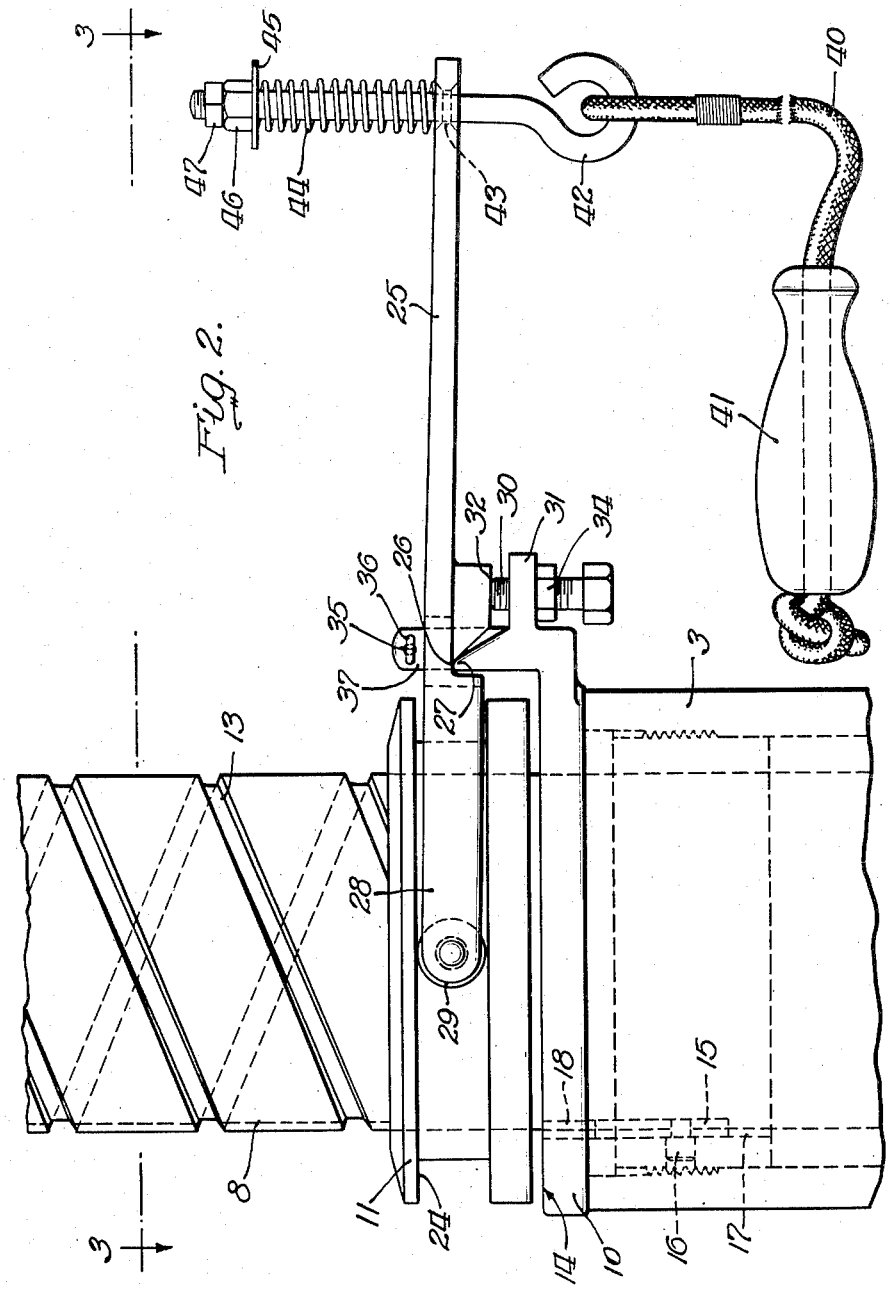
Figure 2 is a fragmentary side elevation view on somewhat enlarged scale showing a portion of the upper end of the cylinder of the jack, the adjacent portion of the piston, and the nut and safety mechanism of the present invention as applied thereto.
Figure 3:
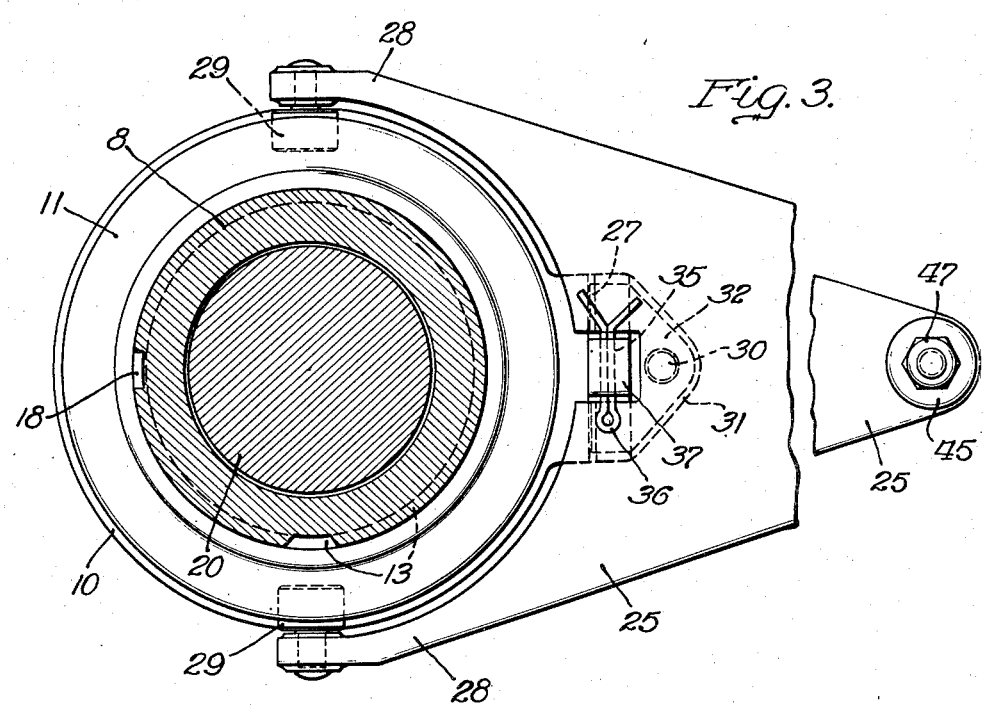
Figure 3 is a sectional view through the piston taken on the line 3—3 of Figure 2 and includes a top plan view of the safety mechanism.

If desired, the spring of the aforementioned resilient connection which is designated by the reference numeral 44' in Figure 5 may be enclosed as therein shown within a sleeve 50 brazed, welded, or otherwise secured at its lower end at 51 to the yoke 25'. The other parts of Figure 5 corresponding to the resilient connection parts of Figure 2 are designated by primed reference characters corresponding to the reference characters used in Figure 2.

The operation of the illustrated embodiment of the invention is as follows:

The operator of one of these jacks positions the same beneath the wing 23 of the airplane, it being understood that one or more of the jacks may be employed with each wing as suitable or desired. The description of the operation will be confined to one jack since that appears to be sufficient for the present application. The upper end 21 of the screw extension 20 is then operated to jacking position in engagement with the cooperating part 22 on the wing 23, for example, by operating the screw extension 20 or the piston rod 8 or by combined operations of both.

The operator then manually operates the pump 4, for example, by lever 9 or otherwise manipulates the hydraulic unit to supply to the cylinder 3 hydraulic power for raising the piston rod 8 and thereby the plane. The coacting relatively steep threads 12 and 13 on the piston rod 8 and safety nut 11 cause the nut 11 to raise from its seat 14 to a predetermined distance in relatively close proximity to the seat 14 and allows the nut 11 to turn while the piston is raising. The weight of the nut 11 permits or causes the nut to remain in close proximity to its seat 14 so that in case of fracture of the hose 5 or failure of the hydraulic system for any reason the nut 11 will move downwardly only a relatively short distance to seat upon its seat 14 and stop the downward movement of the piston rod 8 and the plane carried thereby.

When the operator wishes to lower the plane, he does not leave the hydraulic unit 4 but grasps the handle 41 and puts sufficient force or pull on the control element 40 to swing the yoke 25 clockwise about its fulcrum 27 until the nut 11 raises from its seat, for example, about 1/16 inch to 1/8 inch. The lowering valve is then opened by the lever 6 allowing the piston rod 8 and the plane to be lowered at the proper speed. Should the hose 5 break or the hydraulic system otherwise fail, allowing the piston rod 8 to drop, the amount of force on the control element 40 will be overcome and the nut 11 will seat upon its seat 14 immediately and with only a small distance of downward travel and will not let the plane lower, or, if desired, the operator may release the pressure or pull on the element 40 and the nut 11 will seat and stop the downward travel of the piston rod 8 and the plane. The correction can then be made to any part of the hydraulic system. Then, by giving one stroke to the pump 4, the nut 11 is freed and pressure or pull on the control element 40 will remove the nut 11 from its seat and the lowering operation can be continued.

In the clockwise pivotal movement of the yoke 25 about its fulcrum 27 engagement of the yoke with the adjustable screw 30 stops such pivotal movement of the yoke and thus limits or controls the distance the safety nut may leave its seat.

From the foregoing description, it will be apparent that the safety nut of the present invention is not only safe in the upward travel of the piston and plane but in the downward travel as well. The lowering operation is much faster and much more convenient since the operator does not have to climb the jack and turn the safety nut to the top of the screw and lock it in place.

Failure or accident of the safety nut to turn while raising will cause the upward movement of the nut with the piston to shear the pin 35 and allow the yoke assembly 25 to fall to the ground, thus warning the operator. The plane may then be lowered in the usual manner until the safety nut is freed to turn while the piston is raising and the yoke and a shear pin are installed.

The embodiment of the invention shown in the drawings is for illustrative purposes only and it is to be expressly understood that said drawings and the accompanying specification are not to be construed as a definition of the limits or scope of the invention, reference being had to the appended claims for that purpose.

We claim:

1. In a jack device of the class described, in combination, a supporting member, a first threaded member associated therewith for extending and retracting movements relative thereto, said jack device having means for extending said first threaded member relative to said supporting member, a second threaded member associated with said first threaded member, said threaded members having cooperating relatively steep threads effective upon extending movement of said first threaded member relative to said supporting member to impart extending movement to said second threaded member to position separated from said supporting member, the weight of said second threaded member being effective to cause said second threaded member to remain in relatively close proximity to said supporting member as long as said second threaded member is free to turn relative to said first threaded member during extending movement of said first threaded member, said second threaded member by movement from its position in relatively close proximity to said supporting member and into cooperation with said supporting member limiting the retracting movement of said first threaded member in the event of failure of said extending means, and a coacting member coacting with said second threaded member and with a stop to limit, during extending movement of said first threaded member relative to said supporting member, the amount of extending movement of said second threaded member relative to said supporting member to said position in relatively close proximity to said supporting member whereby the retracting movement of said first threaded member is limited in the event of failure of said extending means, the coaction of said coacting member with said second threaded member permitting turning movement of said second threaded member relative to said coacting member as the weight of said second threaded member causes it to remain in close proximity to said supporting member.

2. In a jack device of the class described, in combination, a supporting member, a first threaded member associated therewith for extending and retracting movements relative thereto, said jack device having means for extending said first threaded member relative to said supporting member, a second threaded member associated with said first threaded member, said threaded members having cooperating relatively steep threads effective upon extending movement of said first threaded member relative to said supporting member to impart extending movement to said second threaded member to position separated from said supporting member, the weight of said second threaded member being effective to cause said second threaded member to remain in relatively close proximity to said supporting member as long as said second threaded member is free to turn relative to said first threaded member during extending movement of said first threaded member, said second threaded member by movement from its position in relatively close proximity to said supporting member and into cooperation with said supporting member limiting the retracting movement of said first threaded member in the event of failure of said extending means, a coacting member coacting with said second threaded member and with a stop to limit, during extending movement of said first threaded member relative to said supporting member, the amount of extending movement of said second threaded member relative to said supporting member to said position in relatively close proximity to said supporting member whereby the retracting movement of said first threaded member is limited in the event of failure of said extending means, the coaction of said coacting member with said second threaded member permitting turning movement of said second threaded member relative to said coacting member as the weight of said second threaded member causes it to remain in close proximity to said supporting member, and means for actuating said coacting member from remote position to lift said second threaded member to position in relatively close proximity to said supporting member and for holding said second threaded member in said position when required for retracting movement of said first threaded member.

3. In a jack device of the class described, in combination, a supporting member, a first threaded member associated therewith for extending and retracting movements relative thereto, said jack device having means for extending said first threaded member relative to said supporting member, a second threaded member associated with said first threaded member, said threaded members having cooperating relatively steep threads effective upon extending movement of said first threaded member relative to said supporting member to impart extending movement to said second threaded member to position separated from said supporting member, the weight of said second threaded member being effective to cause said second threaded member to remain in relatively close proximity to said supporting member as long as said second threaded member is free to turn relative to said first threaded member during extending movement of said first threaded member, said second threaded member by movement from its position in relatively close proximity to said supporting member and into cooperation with said supporting member limiting the retracting movement of said first threaded member in the event of failure of said extending means, a coacting member coacting with said second threaded member and with a stop to limit, during extending movement of said first threaded member relative to said supporting member, the amount of extending movement of said second threaded member relative to said supporting member to said position in relatively close proximity to said supporting member whereby the retracting movement of said first threaded member is limited in the event of failure of said extending means, the coaction of said coacting member with said second threaded member permitting turning movement of said second threaded member relative to said coacting member as the weight of said second threaded member causes it to remain in close proximity to said supporting member, and retention means coacting with said coacting member to hold same in place and adapted to permit displacement of said coacting member to warn the operator in case of extending movement of said second threaded member beyond said position of close proximity to said supporting member due to failure of said second threaded member to turn during extending movement of said first threaded member.

4. In a lifting jack, in combination, a supporting member, a member having extending and retracting movements relative to said supporting member, a safety nut on said extending and retracting member, said nut having a relatively steep internal thread coacting with a relatively steep external thread on said extending and retracting member for extending said nut from said supporting member and allowing said nut to turn while said extending and retracting member is extending, said nut having an annular external groove, a yoke pivoted on a fulcrum and having a forked part with arms at opposite sides of said nut, rollers carried by the arms of said forked part and operating in said external groove in said nut, a control element operable from remote position for imparting pivotal movement to said yoke to lift said nut to extended position and for holding said nut in said position when required for lowering said extending and retracting member, a resilient connection between said control element and said yoke so that the operator in manipulation of said control element has less chance of permitting said nut to seat accidentally against said seat, and a stop coacting with said yoke to limit pivotal movement of said yoke for stopping said nut in position in close proximity to said supporting member.

5. In a lifting jack, in combination, a supporting member, a member having extending and retracting movements relative to said supporting member, a safety nut on said extending and retracting member, said nut having a relatively steep internal thread coacting with a relatively steep external thread on said extending and retracting member for extending said nut from said supporting member and allowing said nut to turn while said extending and retracting member is extending, said nut having an annular external groove, a yoke pivoted on a fulcrum and having a forked part with arms at opposite sides of said nut, rollers carried by the arms of said forked part and operating in said external groove in said nut, a control element operable from remote position for imparting pivotal movement to said yoke to lift said nut to extended position and for holding said nut in said position when required for lowering said extending and retracting member, a resilient connection between said control element and said yoke so that the operator in manipulation of said control element has less chance of permitting said nut to seat accidentally against said supporting member, a stop coacting with said yoke to limit pivotal movement of said yoke for stopping extending movement of said nut in position in close proximity to said supporting member, and shear means holding said yoke in place adjacent to said fulcrum and allowing said yoke to break loose and fall to the ground to warn the operator in case said nut fails to turn while said extending and retracting member is being extended.

6. In a lifting jack, in combination, a first supporting member, a second member having extending and retracting movements relative to said first member, a safety nut on said second member and adapted to seat on said first member to stop retracting movement of said second member, said second member and said safety nut having coacting relatively steep threads for raising said nut from said first member, and allowing said nut to turn so that the weight of the nut will cause said nut to remain in relatively close proximity to said first member while said second member is extending, and means for restraining raising of said safety nut beyond position in relatively close proximity to said first member when said second member is extending, said restraining member being operable to warn the operator in the event said safety nut fails to turn and is lifted beyond position in close proximity to said first member.

7. In a jack device of the class described, in combination, a supporting member, a first threaded member associated therewith for extending and retracting movements relative thereto, said jack device having means for extending said first threaded member relative to said supporting member, a second threaded member associated with said first threaded member, said threaded members having cooperating relatively steep threads effective upon extending movement of said first threaded member relative to said supporting member to impart extending movement to said second threaded member to position separated from said supporting member, the weight of said second threaded member being effective to cause said second threaded member to remain in relatively close proximity to said supporting member as long as said second threaded member is free to turn relative to said first threaded member during extending movement of said first threaded member, said second threaded member by movement from its position in relatively close proximity to said supporting member and into cooperation with said supporting member limiting the retracting movement of said first threaded member in the event of failure of said extending means, and a coacting member coacting with said second threaded member and operable to hold said second threaded member in position separated from and in relatively close proximity to said supporting member, the coaction of said coacting member with said second threaded member permitting turning movement of said second threaded member relative to said first threaded member so as to permit retracting movement of said first threaded member relative to said second threaded member when said second threaded member is held in position separated from and in close proximity to said supporting member.

8. A lifting jack according to claim 7 wherein the coacting member for holding the second threaded member in position separated from and in relatively close proximity to said supporting member is also operable to move said second threaded member to said position separated from and in relatively close proximity to said supporting member.

9. A lifting jack according to claim 7 wherein there is means operable from remote position for moving said second threaded member from position in cooperation with said supporting member to said position separated from and in relatively close proximity to said supporting member.

10. A lifting jack according to claim 7 wherein the coacting member for holding the second threaded member in position separated from and in relatively close proximity to said supporting member is also operable to move said second threaded member to said position separated from and in relatively close proximity to said supporting member, and a stop coacting with said coacting member for limiting the amount of separation of said second threaded member from said supporting member.

11. In a lifting jack, in combination, a first supporting member, a second member having extending and retracting movements relative to said first member, a safety nut on said second member and adapted to seat on said first member to stop retracting movement of said second member, said second member and said safety nut having coacting relatively steep threads for raising said nut from said first member and allowing said nut to turn so that the weight of the nut will cause said nut to remain in relatively close proximity to said first member while said second member is extending, means for limiting the raising of said safety nut to position in relatively close proximity to said first member when said second member is extending, and means for lifting said safety nut to raised position separated from and in relatively close proximity to said first member and for holding said nut in said position while allowing said nut to turn so that said second member may be retracted, the means for lifting said safety nut comprising a pivoted member having lifting coaction with said safety nut while allowing it to turn.

12. In a lifting jack, in combination, a first supporting member, a second member having extending and retracting movements relative to said first member, a safety nut on said second member and adapted to seat on said first member to stop retracting movement of said second member, said second member and said safety nut having coacting relatively steep threads for raising said nut from said first member and allowing said nut to turn so that the weight of the nut will cause said nut to remain in relatively close proximity to said first member while said second member is extending, means for limiting the raising of said safety nut to position in relatively close proximity to said first member when said second member is extending, means for lifting said safety nut to raised position separated from and in relatively close proximity to said first member and for holding said nut in said position while allowing said nut to turn so that said second member may be retracted, the means for lifting said safety nut comprising a lifting member having lifting coaction with said safety nut while allowing it to turn, and means operable from remote position for actuating said lifting member to lift said safety nut.

13. In a lifting jack, in combination, a first supporting member, a second member having extending and retracting movements relative to said first member, a safety nut on said second member and adapted to seat on said first member to stop retracting movement of said second member, said second member and said safety nut having coacting relatively steep threads for raising said nut from said first member and allowing said nut to turn so that the weight of the nut will cause said nut to remain in relatively close proximity to said first member while said second member is extending, means for limiting the raising of said safety nut to position in relatively close proximity to said first member when said second member is extending, means for lifting said safety nut to raised position separated from and in relatively close proximity to said first member and for holding said nut in said position while allowing said nut to turn so that said second member may be retracted, the means for lifting said safety nut comprising a pivoted member having lifting coaction with said safety nut while allowing it to turn, and means comprising a flexible control element having resilient connection with said pivoted member and operable from remote position for actuating said pivoted member to lift said safety nut.

14. In a lifting jack, in combination, a first supporting member, a second member having extending and retracting movements relative to said first member, a safety nut on said second member and adapted to seat on said first member to stop retracting movement of said second member, said second member and said safety nut having coacting relatively steep threads for raising said nut from said first member and allowing said nut to turn so that the weight of the nut will cause said nut to remain in relatively close proximity to said first member while said second member is extending, means for limiting the raising of said safety nut to position in relatively close proximity to said first member when said second member is extending, means for lifting said safety nut to raised position separated from and in relatively close proximity to said first member and for holding said nut in said position while allowing said nut to turn so that said second member may be retracted, the means for lifting said safety nut comprising a pivoted lever having a forked part with arms at opposite sides of said safety nut, and rollers carried by said arms and operating in a groove in said safety nut.

15. In a lifting jack, in combination, a first supporting member, a second member having extending and retracting movements relative to said first member, a safety nut on said second member and adapted to seat on said first member to stop retracting movement of said second member, said second member and said safety nut having coacting relatively steep threads for raising said nut from said first member and allowing said nut to turn so that the weight of the nut will cause said nut to remain in relatively close proximity to said first member while said second member is extending, means for limiting the raising of said safety nut to position in relatively close proximity to said first member when said second member is extending, and means for lifting said safety nut to raised position separated from and in relatively close proximity to said first member and for holding said nut in said position while allowing said nut to turn so that said second member may be retracted, the means for limiting the raising of said safety nut comprising a stop cooperable with said means for lifting said safety nut to raised position separated from and in relatively close proximity to said first member.

16. In a lifting jack, in combination, a first supporting member, a second member having extending and retracting movements relative to said first member, a safety nut on said second member and adapted to seat on said first member to stop retracting movement of said second member, said second member and said safety nut having coacting relatively steep threads for raising said nut from said first member and allowing said nut to turn so that the weight of the nut will cause said nut to remain in relatively close proximity to said first member while said second member is extending, means for limiting the raising of said safety nut to position in relatively close proximity to said first member when said second member is extending, and means for lifting said safety nut to raised position separated from and in relatively close proximity to said first member and for holding said nut in said position while allowing said nut to turn so that said second member may be retracted, the means for limiting the raising of said safety nut comprising a stop screw cooperable with said means for lifting said safety nut to raised position, said screw being adjustable to adjust the amount of raising movement to which said safety nut is limited.

17. In a lifting jack, in combination, a first supporting member, a second member having extending and retracting movements relative to said first member, a safety nut on said second member and adapted to seat on said first member to stop retracting movement of said second member, said second member and said safety nut having coacting relatively steep threads for raising said nut from said first member and allowing said nut to turn so that the weight of the nut will cause said nut to remain in relatively close proximity to said first member while said second member is extending, means for limiting the raising of said safety nut to position in relatively close proximity to said first member when said second member is extending, means for lifting said safety nut to raised position separated from and in relatively close proximity to said first member and for holding said nut in said position while allowing said nut to turn so that said second member may be retracted, the means for limiting the raising of said safety nut comprising a stop cooperable with said lifting member, and retention means coacting with said lifting member to hold said lifting member in place and adapted to permit displacement of said lifting member to warn the operator in the event said safety nut is lifted beyond the position in relatively close proximity to said first member.

References Cited in the file of this patent

UNITED STATES PATENTS

| | | |
|---|---|---|
| 2,372,196 | Grime | Mar. 27, 1945 |
| 2,408,181 | Simonton | Sept. 24, 1946 |
| 2,432,096 | Hammond | Dec. 9, 1947 |
| 2,455,439 | Page | Dec. 7, 1948 |